US012214230B2

(12) United States Patent
Hulbert

(10) Patent No.: US 12,214,230 B2
(45) Date of Patent: Feb. 4, 2025

(54) NUTRITION TUBE CONNECTOR FOR SEALED NUTRITION POUCH

(71) Applicant: D. Wheatley Enterprises, Inc., Belcamp, MD (US)

(72) Inventor: Patrick Hulbert, Dallastown, PA (US)

(73) Assignee: D. Wheatley Enterprises, Inc., Belcamp, MD (US)

( * ) Notice: Subject to any disclaimer, the term of this patent is extended or adjusted under 35 U.S.C. 154(b) by 938 days.

(21) Appl. No.: 17/319,490

(22) Filed: May 13, 2021

(65) Prior Publication Data

US 2021/0353506 A1 Nov. 18, 2021

Related U.S. Application Data

(60) Provisional application No. 63/024,278, filed on May 13, 2020.

(51) Int. Cl.

| | |
|---|---|
| ***A62B 18/08*** | (2006.01) |
| *A61J 1/10* | (2006.01) |
| *A61J 15/00* | (2006.01) |

(52) U.S. Cl.
CPC ............... *A62B 18/086* (2013.01); *A61J 1/10* (2013.01); *A61J 15/0011* (2013.01); *A61J 15/0026* (2013.01)

(58) Field of Classification Search
CPC ....... A62B 18/00; A62B 18/02; A62B 18/025; A62B 18/08; A62B 18/086
See application file for complete search history.

(56) References Cited

U.S. PATENT DOCUMENTS

| | | | | |
|---|---|---|---|---|
| 2,023,267 A | 12/1935 | Rapt et al. | | |
| 6,325,116 B1 * | 12/2001 | Savage | ................ | A62B 18/086 141/383 |

(Continued)

FOREIGN PATENT DOCUMENTS

| | | |
|---|---|---|
| WO | 2005/035365 | 4/2005 |

OTHER PUBLICATIONS

International Search Report issued in corresponding International Patent Application No. PCT/US21/32232 on Aug. 24, 2021.

*Primary Examiner* — Colin W Stuart
(74) *Attorney, Agent, or Firm* — Whiteford, Taylor & Preston, LLP; Gregory M. Stone

(57) ABSTRACT

Disclosed is a connector for connecting a sealed, flexible nutrition pouch to the hydration system of a user's protective mask, that allows the nutrition pouch to remain sealed until the user intends to consume the product inside of the nutrition pouch, enables resealing of the pouch after it has initially been opened, and allows connection of the nutrition pouch to the user's hydration system. The connector comprises a multi-piece body having an inlet end that may be manually attached to the outlet of the nutrition pouch without breaking the seal covering the outlet of the nutrition pouch. The connector likewise has an outlet end configured for attachment to an adapter on the user's fluid delivery system. Upon attachment of the adapter to the outlet of the connector, a piston inside of the connector is pushed toward the outlet of the nutrition pouch and breaks the seal over the outlet of the nutrition pouch, thus forming a flow channel for material in the nutrition pouch to flow through the connector and into the adapter and fluid delivery system for ultimate consumption by the user.

14 Claims, 7 Drawing Sheets

(56) References Cited

U.S. PATENT DOCUMENTS

| | | | | |
|---|---|---|---|---|
| 7,073,688 | B2 | 7/2006 | Choi et al. | |
| 2002/0022808 | A1 | 2/2002 | Horn et al. | |
| 2004/0155054 | A1 | 8/2004 | McKitrick | |
| 2004/0211484 | A1 | 10/2004 | Fournie et al. | |
| 2005/0051235 | A1 | 3/2005 | Kline | |
| 2005/0072422 | A1* | 4/2005 | Wolfe | A62B 18/086 128/202.15 |
| 2005/0126566 | A1* | 6/2005 | Stone | A62B 18/086 128/201.22 |
| 2005/0241641 | A1* | 11/2005 | Fletcher | B63C 11/02 128/205.22 |
| 2009/0045205 | A1* | 2/2009 | Wild | A62B 18/086 383/127 |
| 2011/0089686 | A1* | 4/2011 | Wheatley | F16L 37/101 285/314 |
| 2012/0103327 | A1* | 5/2012 | Low | A62B 18/086 128/202.15 |

* cited by examiner

NUTRITION TUBE CONNECTOR FOR SEALED NUTRITION POUCH

CROSS-REFERENCE TO RELATED APPLICATIONS

This application is based upon and claims the benefit of U.S. Provisional Application No. 63/024,278 titled "Nutrition Tube Connector for Sealed Nutrition Pouch," filed May 13, 2020, which application is incorporated herein by reference in its entirety.

FIELD OF THE INVENTION

This invention relates generally to fluid delivery systems for protective masks, and more particularly to a connector for enabling the attachment of a small nutrition pouch to a hydration system of a user's protective mask, such as a gas mask.

BACKGROUND

Emergency personnel are often exposed to harsh environments, some of which may be so threatening to their health that they must wear a safety mask, such as a gas mask equipped with filtration devices, to operate. For example, firefighters and first responders may be tasked with working in environments in which air-born contaminants are present, which may cause injury or death to the user if inhaled or ingested. In such environments, it is critical that the operator not break the seal of their mask while exposed to that environment.

Nonetheless, the work that they must carry out in such environments can be difficult and physically taxing, in which case nutrition and hydration may become essential to allow the operator to continue carrying out their task. However, the need to keep the seal of their mask is paramount, thus requiring that they leave such hazardous environment (and thus stop performing the important rescue, safety, clean-up, or other task they were carrying out) to obtain such needed nutrition or hydration. Such interruption is not desirable, and in critical conditions may be deadly to persons requiring rescue from the contaminated environment.

Disposable sealed packages or pouches of various nutrients may be provided for a wide variety of uses, offering a small, light-weight, and readily portable package that may be used while a person is generally on the move. While emergency personnel working in the environments described above could significantly benefit from having access to and being able to consume product from such sealed packages while having to exert significant physical effort in the above-described environments, the same challenge of requiring a breaking of the mask seal in order to consume the contents of such pouches has rendered them generally unsuitable for use in such environments. While systems have been previously provided to enable emergency personnel wearing a safety mask, such as a gas mask, to drink fluid through a fluid delivery hose (e.g., fluid stored in portable pack carrying a fluid dispensing system and attached to the user's mask via a hose, with a drinking device inside of the user's mask), the small, portable and disposable packages described here have not found application to such configurations.

Therefore, there remains a need in the art for a system that would enable an operator wearing a safety mask, such as a gas mask, equipped with a drinking device inside of the mask, to be able to engage a disposable, sealed nutrition pouch to consume its contents without having to remove their mask.

SUMMARY OF THE INVENTION

Disclosed herein is a connector enabling the connection of a sealed, flexible nutrition pouch to the hydration system of a user's mask, such as gas mask, that allows the nutrition pouch to remain sealed, with the connector attached, until the user intends to consume the product inside of the nutrition pouch, enables resealing of the pouch after it has initially been opened, and allows connection of the nutrition pouch to the user's hydration system that would otherwise be used to deliver water, such as might be contained in a flexible container (such as a CAMELBAK container carried on the back of the user). The connector comprises a body having an inlet end that may be manually attached to the outlet of the nutrition pouch without breaking the seal covering the outlet of the nutrition pouch. The connector likewise has an outlet end configured for attachment to an adapter on the user's fluid delivery system. Upon attachment of the adapter to the outlet of the connector, a piston inside of the connector is pushed toward the outlet of the nutrition pouch and breaks the seal over the outlet of the nutrition pouch, thus forming a flow channel for material in the nutrition pouch to flow through the connect and into the adapter and fluid delivery system for ultimate consumption by the user.

In a particularly preferred configuration, the connector is formed entirely without welded components and is configured with multiple snap-fit connections that ease the assembly of the connector and the supply of components of the connector. Nonetheless, even with such a snap-fit assembly, the connector includes multiple compressible sealing members, such as O-rings, that are configured and positioned in the connector so as to maintain a tight seal between (i) the connector and the flexible nutrition container, and (ii) the connector and both a removable cap plug and a hydration system adapter at the outlet end of the connector. Such sealing members are preferably configured to provide protection against chemical, biological, radiological, and nuclear ("CBRN") contaminants reaching the consumable product within the nutrition pouch. Also in a particularly preferred configuration, the connector may formed of inexpensive and readily commercially available materials, such as plastic, rendering it suitable for its intended use as a disposable, single use product that may be disposed of with the flexible nutrition pouch after its contents have been consumed.

In accordance with certain aspects of an embodiment of the invention, a nutrition tube connector is provided comprising a multi-piece body portion defining an internal channel extending from a bottom of the multi-piece body portion to a top of the multi-piece body portion, at least one body retainer holding multiple sections of the multi-piece body portion in a fixed configuration, a spool core having a bottom head, a central portion and an upper head, wherein the bottom head and the central portion are positioned inside of the internal channel of the multi-piece body portion and the upper head extends above a top end of the multi-piece body portion, the spool core having an open piston chamber extending there through, a piston movably mounted in the piston chamber and held in an upper position in the piston chamber at a detent, and a cap plug removably positioned in a cap plug receiver at a top end of the spool core.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE FIGURES

The novel features of the invention are set forth with particularity in the appended claims. A better understanding of the features and advantages of the present invention will be obtained by reference to the following detailed description that sets forth illustrative embodiments, in which the principles of the invention are utilized. The present invention is illustrated by way of example, and not by way of limitation, in the figures of the accompanying drawings, in which like reference numerals refer to similar elements, and in which:

DETAILED DESCRIPTION OF THE PREFERRED EMBODIMENTS

Figure 1:
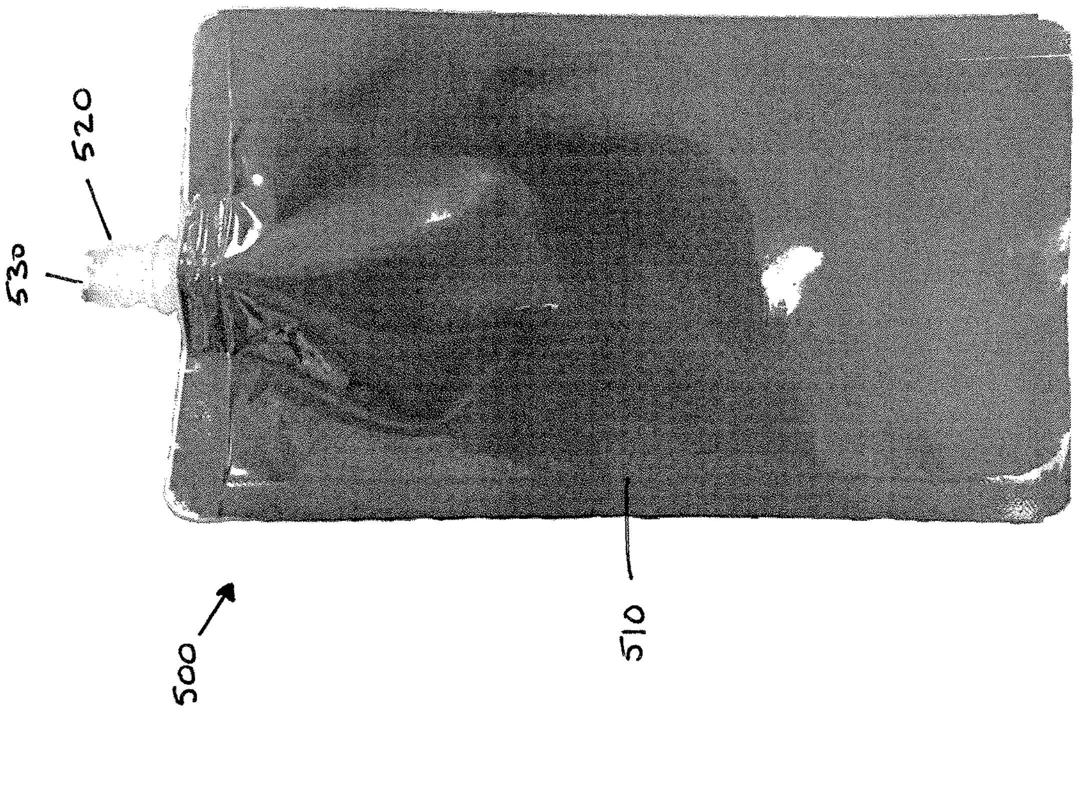
FIG. 1 is a side view of a nutrition pouch for use with a nutrition pouch connector configured in accordance with certain aspects of an embodiment of the invention.

The invention may be understood by referring to the following description and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. Furthermore, the use of the terms a, an, etc. does not denote a limitation of quantity, but rather denotes the presence of at least one of the referenced item.

The use of the terms “first”, “second”, and the like does not imply any particular order, but they are included to identify individual elements. Moreover, the use of the terms first, second, etc. does not denote any order of importance, but rather the terms first, second, etc. are used to distinguish one element from another. It will be further understood that the terms “comprises” and/or “comprising”, or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Unless otherwise indicated, all dimensions shown in the attached drawings are exemplary only and should not be construed as limiting the scope of the invention to those specific dimensions.

Disclosed herein is a connector for attaching a disposable nutrition pouch to a nutrition feeding tube that leads to a drinking device inside of a safety mask, such as a gas mask, of a user, which connector allows the user to attach their nutrition feeding tube to the pouch and create a product flow there between to consume its contents without having to remove their mask. The inlet of the connector may be screw-fitted to the dispensing outlet of a disposable nutrition pouch, with a manually removable cap plug maintained over the outlet of the connector until the user wishes to consume the product. When a user wearing a safety mask wishes to consume the product within the nutrition pouch, they may manually remove the cap plug from the outlet of the connector, insert the adapter from their fluid delivery system hose into the outlet of the connector (in turn causing a bladed end of an internal piston to only then pierce the sealed outlet of the nutrition pouch), and thereafter draw nutrient from the pouch, through the connector into their fluid delivery hose and ultimately to the drinking device inside of their safety mask, all without breaking the seal of their safety mask against their face. Those skilled in the art will recognize that systems employing a fluid delivery tube leading, for example, from a fluid source (such as a CAMELBAK container) at the drinking tube inlet to a drinking device at the drinking tube outlet inside of a safety mask, are known in the art, such that their construction is not detailed in the instant specification, as the instant specification is particularly directed to a connector for attaching such a fluid delivery tube to a disposable nutrition pouch as detailed below.

Figure 2:
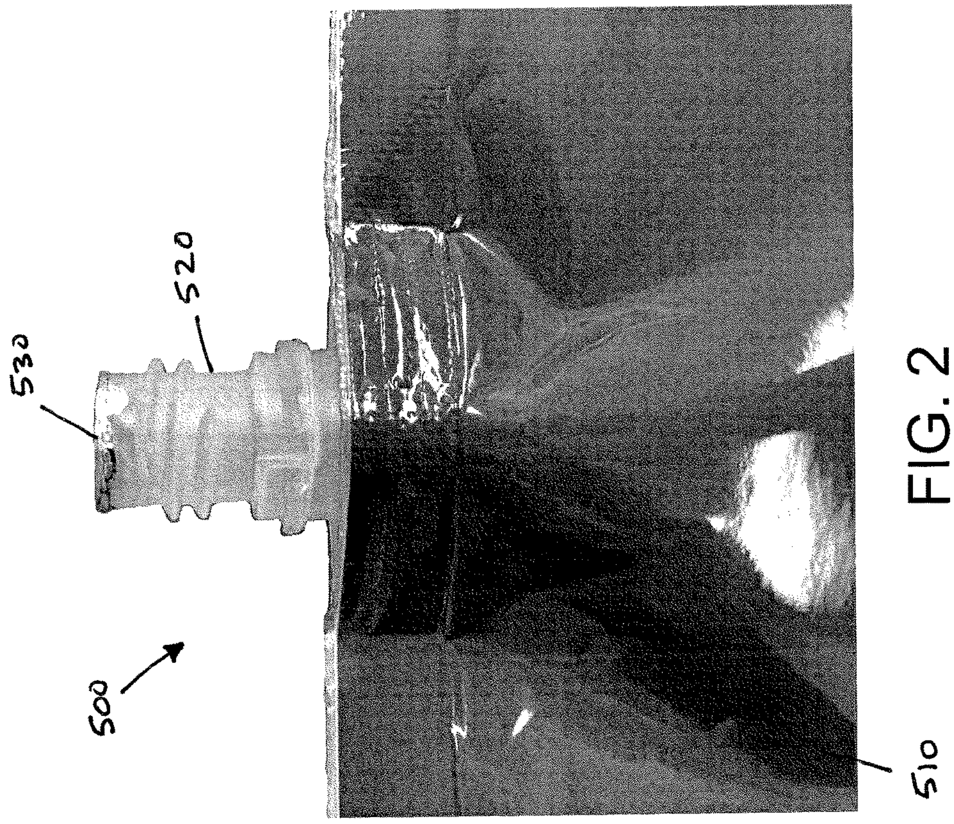
FIG. 2 is a close-up side view of the outlet of the nutrition pouch of FIG. 1.
Figure 3:
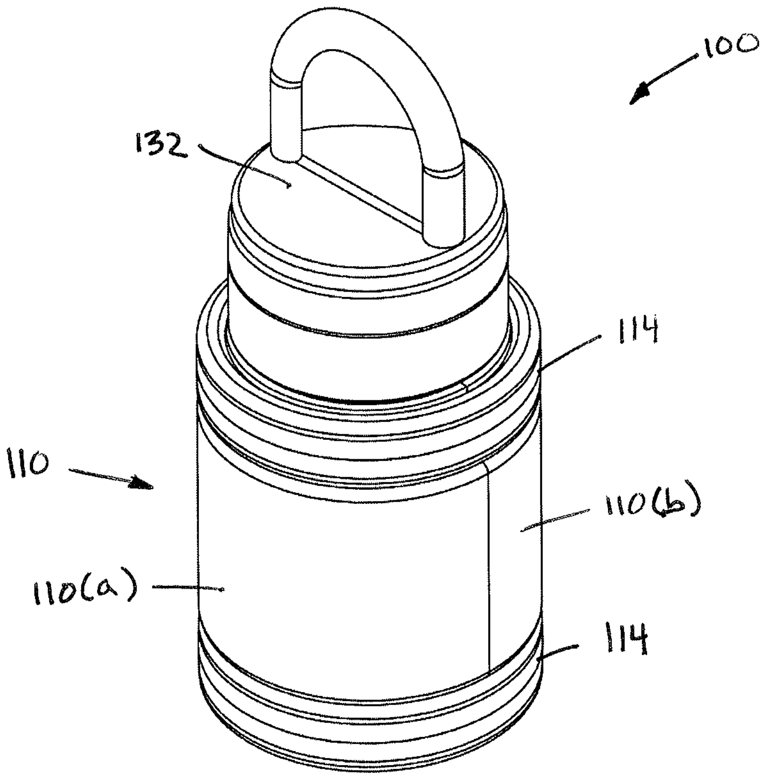
FIG. 3 is a side perspective view of a nutrition pouch connector in accordance with certain aspects of an embodiment of the invention.
Figure 4:
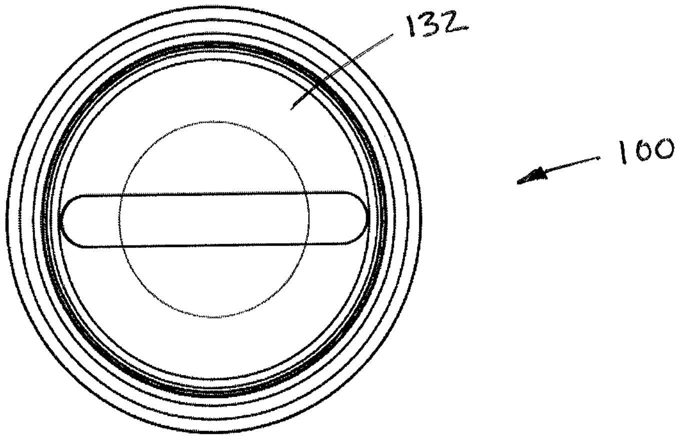
FIG. 4 is a top view of the nutrition pouch connector of FIG. 3.
Figure 5:
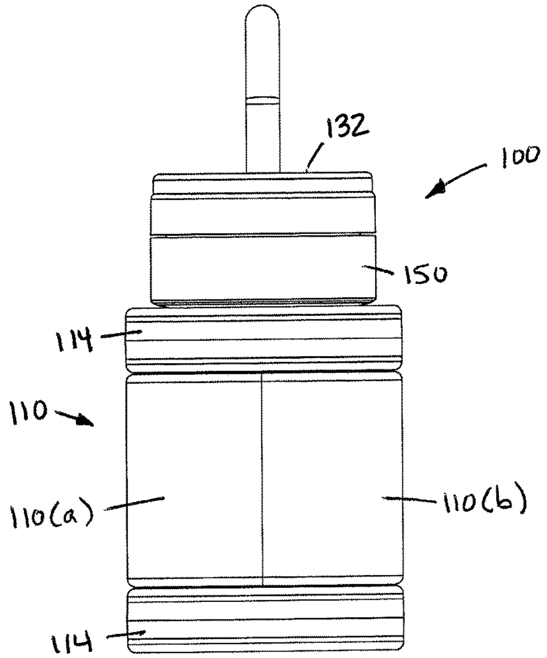
FIG. 5 is a front view of the nutrition pouch connector of FIG. 3.
Figure 6:
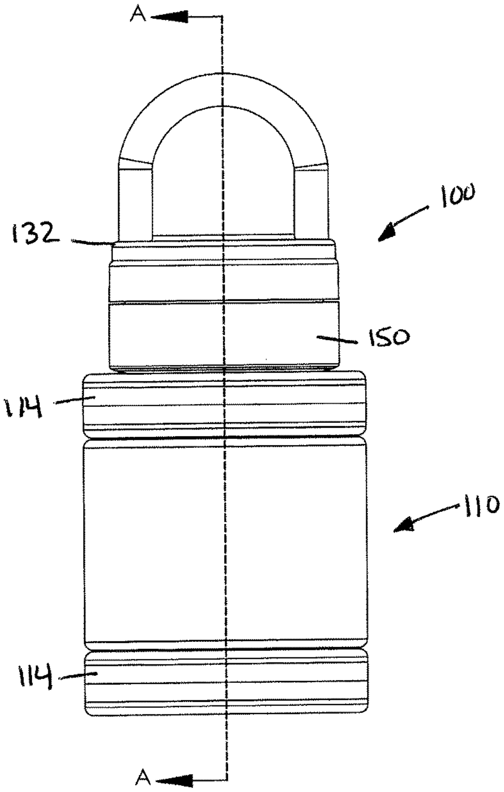
FIG. 6 is a side view of the nutrition pouch connector of FIG. 3.

A suitable nutrition pouch 500 is shown in FIGS. 1 and 2, and comprises a generally flexible bag body portion 510, a dispensing outlet 520 having external threads, and a pierceable foil cover 530, which elements are discussed in greater detail below with regard to their interaction with a connector as described herein. Such nutrition pouches 500 may be filled with a consumable, fluid nutrient using one of a large number of known and readily available fluid product handling devices, and thereafter sealed with pierceable foil cover 530 (such as by way of non-limiting example through heat-sealing pierceable foil cover 530 to the end of dispensing outlet 520) to seal the contents until ready for use and consumption.

Figure 7:
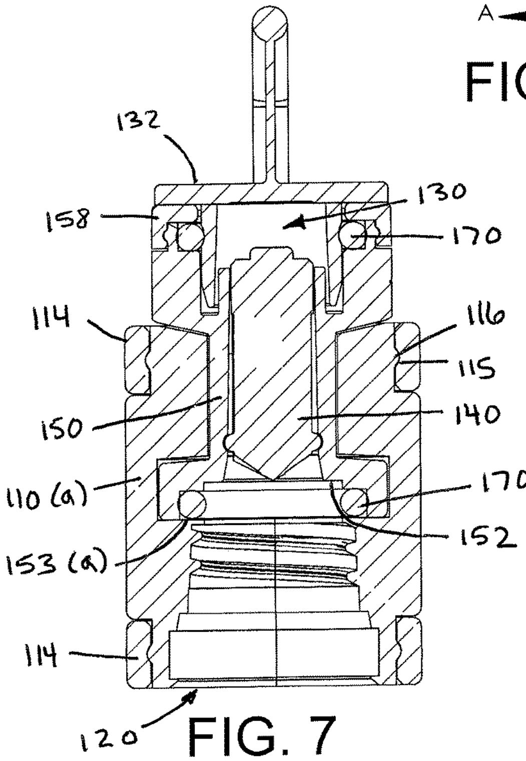
FIG. 7 is a sectional view of the nutrition pouch connector along section line A-A of FIG. 6.

As shown in FIGS. 3 through 7, a connector 100 is provided having a body portion 110 comprising a first body half 110(*a*) and a second body half 110(*b*) that together form a generally cylindrical outer wall of connector 100. Both a top and bottom portion of first body half 110(*a*) and second body half 110(*b*) may have a reduced diameter, smaller in size than the mid-portion of each body half, such that when the two body halves 110(*a*) and 110(*b*) are placed together, both the top and bottom portions may receive body retainers 114 that serve to clamp the two body halves together into a single cylindrical assembly. As best shown in FIG. 7, each body retainer 114 is preferably in the form of a ring having an internal notch 115 that receives an outwardly extending ridge 116 on the reduced diameter top and bottom portions of first body half 110(*a*) and second body half 110(*b*), thus allowing them to be snap-fitted onto the body for ease of assembly of connector 100.

As best shown in FIG. 7, the bottom of connector 100 forms a connector inlet 120 that removably receives the dispensing outlet 520 of nutrition pouch 500 (FIGS. 1 and 2). Likewise, the top of connector 100 forms a connector outlet 130 that removably receives cap plug 132, as discussed in greater detail below. The dispensing outlet 520 of nutrition pouch 500 may have a fastening mechanism, such as threads, configured to mate with a complementary fastening mechanism on the interior of inlet 120 of connector 100, with pierceable foil cover 530 remaining intact over the dispensing outlet 520 after connector 100 has been affixed to nutrition pouch 500. Those skilled in the art will recognize that any flowable nutrient may be packaged in sealed nutrition pouch 500, ranging from water, to vitamin- or electrolyte-infused drinks, to liquefied meals or other compositions capable of drawing through an operator's hose and into their mask for consumption. When attached to connector 100 with cap plug 132 intact on the connector outlet 130, an internal piston 140 (discussed in greater detail below) is seated in an initial upper position such that it does not engage the foil cover 530 over dispensing outlet 520 of nutrition pouch 500. Likewise when so attached to connector 100, the outer perimeter of such foil covering 530 abuts a pouch outlet seat 152 on a spool core 150 (discussed in greater detail below), thus maintaining the contents of nutrition pouch 500 in a sealed condition even following attachment of connector 100 to nutrition pouch 500. Inside of connector 100, spool core 150 also preferably receives an O-ring 170 just below pouch outlet seat 152 and positioned to abut and seal against the top, outer perimeter of the dispensing outlet 520 of nutrition pouch 500 when fully inserted into connector inlet 120 of connector 100.

Figure 8:
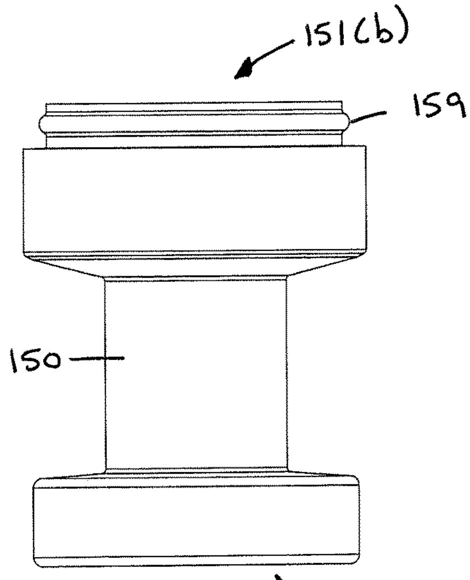
FIG. 8 is a side view of a spool core of the nutrition pouch connector of FIG. 3.
Figure 9:
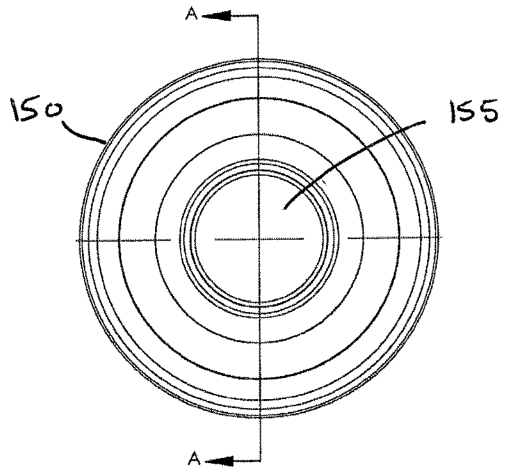
FIG. 9 is a top view of the spool core of FIG. 8.
Figure 10:
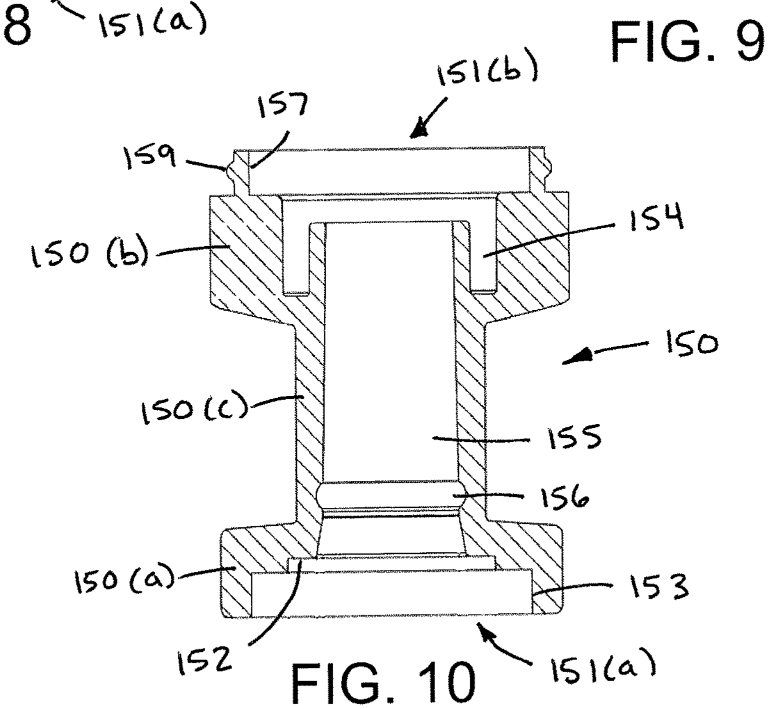
FIG. 10 is a sectional view of the spool core of FIG. 8.

With continued reference to FIG. 7 and further reference to FIGS. 8-10, spool core 150 extends upward and out from the top end of body 110 of connector 100, and has a lower head 150(*a*), upper head 150(*b*), and central portion 150(*c*) having a smaller diameter dimension than each of lower head 150(*a*) and upper head 150(*b*). Lower head 150(*a*) of spool core 150 sits within a cavity in body 110 such that it is fixed within body 110 when assembled. Spool core 150 defines an open inlet end 151(*a*) and an open outlet end 151(*b*). As noted above, open inlet end 151(*a*) is configured to receive the dispensing outlet 520 of nutrition pouch 500 such that the top of the dispensing outlet 520 of the nutrition pouch 500 abuts pouch outlet seat 152 when the dispensing outlet 520 is fully threaded and seated into body 110. Likewise and as mentioned above, a compressible sealing member such as O-ring 170 is seated in a bottom compressible member seal seat 153 for sealing against the outer circumference of dispensing outlet 520 of nutrition pouch 500, thus forming a tight seal between connector 100 and nutrition pouch 500. As shown particularly in FIG. 7, O-ring 700 is supported from below by horizontal wall 153(*a*) on the interior of body portion 110.

Further, open outlet end 151(*b*) of spool core 150 defines a cap plug receiver 154. Cap plug receiver 154 is formed as an open cylindrical channel extending downward from the open outlet end 151(*b*) of spool core 150, such channel having an outer perimeter wall formed by the outer, top wall portion of spool core 150, and such channel having an inner perimeter wall that is defined by the top, outer portion of a piston cylinder 155 centered within spool core 150.

Piston cylinder 155 provides a channel through which internal piston 140 travels when engaged to pierce through the sealed foil covering 530 over dispensing outlet 520 of nutrition pouch 500. As best shown in FIG. 7, piston cylinder 155 is preferably slightly pitched inward as it extends upward through spool core 150, slightly narrowing toward the top of piston cylinder 155 so as to minimize the resistance of movement of internal piston 140 through piston cylinder 155. To ensure that internal piston 140 is maintained in the disengaged position until affirmatively engaged to pierce the sealed dispensing outlet 520 of nutrition pouch 500, the bottom of piston 140 includes a ridge (discussed in greater detail below) that engages a circumferential notch 156 at the lower end of piston cylinder 155 in a snap fit engagement. Both piston 140 and spool core 150 are formed of a sufficiently flexible material so as to maintain a firm grip between piston 140 and piston cylinder 155 at notch 156, but to also allow the ridge on piston 140 to be manually pushed out of circumferential notch 156 when affirmatively engaged (such as through attachment of an adapter to the top of connector 100, as discussed in greater detail below), to in turn pierce the foil seal 530 overtop of outlet 520 of nutrition pouch 500.

Open outlet end 151(*b*) provides a top compressible member seal seat 157 that, as best viewed in FIG. 7, may receive another compressible sealing member such as an O-ring 170 for providing a seal against cap plug 132, as well as a seal against an exterior of a drinking tube adapter after cap plug 132 has been removed and such adapter has been inserted into connector outlet 130 as further discussed below. In order to hold such upper compressible sealing member 170 on spool core 150, a spool core end cap 158 (FIG. 7) is preferably snap-fitted over ridge 159 on outer circumferential wall of top compressible member seal seat 157.

Figure 11:
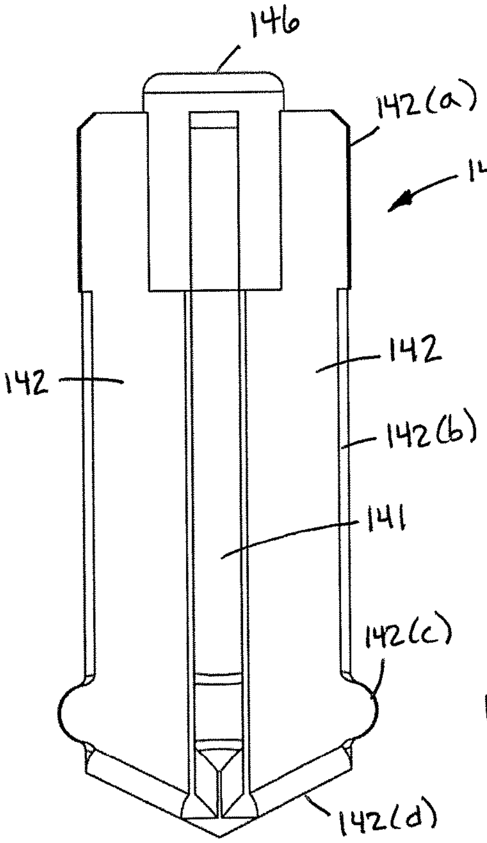
FIG. 11 is a side view of an internal piston of the nutrition pouch connector of FIG. 3.
Figure 12:
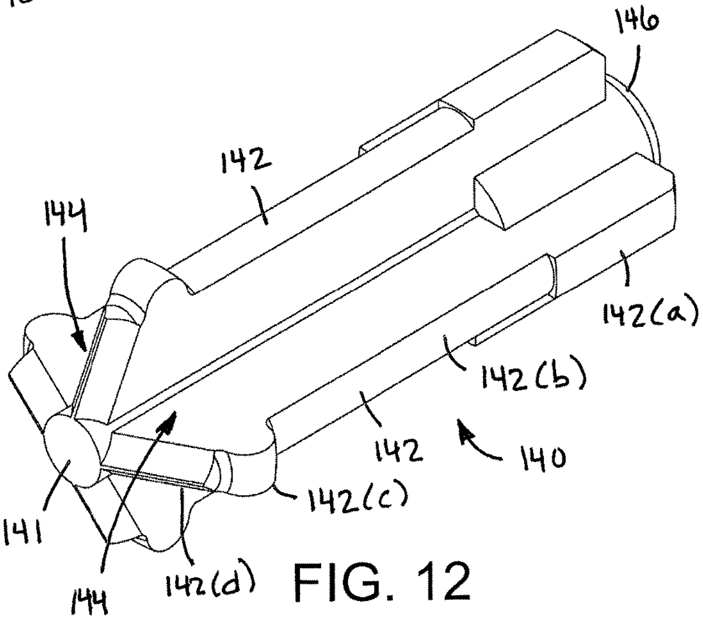
FIG. 12 is a perspective view of the internal piston of FIG. 11.
Figure 13:
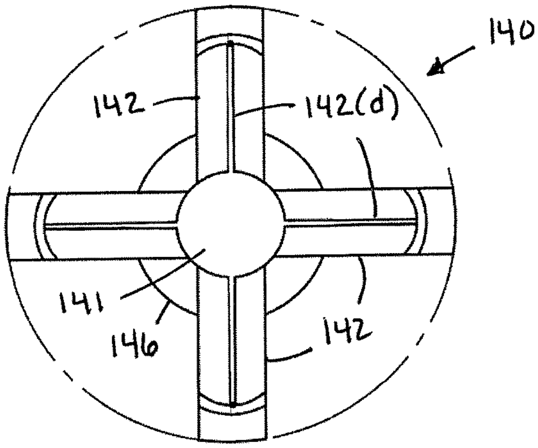
FIG. 13 is a bottom end view of the internal piston of FIG. 11.

Next and as shown in FIGS. 11-13 and with respect to further aspects of an embodiment, internal piston 140 preferably comprises a central cylindrical rod 141 that carries multiple arms 142 that extend radially outward from central cylindrical rod 141. Each arm 142 has a head portion 142(*a*), a central portion 142(*b*), a ridged portion 142(*c*), and a blade portion 142(*d*). Head portion 142(*a*) is sized to contact the inner circumference of piston cylinder 155 at the uppermost portion of piston cylinder 155, thus further aiding in holding internal piston 140 in the disengaged, upper position shown in FIG. 7 until it is intentionally pushed downward to break the foil covering 530 over dispensing outlet 520 of nutrition pouch 500. Central portion 142(*b*) of each arm 142 extends radially outward from the central cylindrical rod 141 of internal piston 140 by a smaller amount than head portion 142(*a*), such that that majority of the length of the arms 142 of internal piston 140 are not in contact with the interior wall of piston cylinder 155, thus easing movement of internal piston 140 after it has been pushed out of its upper, disengaged position. Further, ridged portion 142(*c*) of each arm 142 has a rounded outer perimeter configured to mate with circumferential notch 156 at the bottom of piston cylinder 155 in a snap-fit engagement that again may be easily overcome when internal piston 140 is intentionally pushed downward out of its upper, disengaged position. Finally, blade portion 142(*d*) of each arm 142 has a tapered head configured to aid in piercing the foil cover 530 over dispensing outlet 520 of nutrition pouch 500.

A flow channel 144 is defined between each adjacent pair of arms 142 through which product from nutrition pouch 500 may flow to the connector outlet 130 of connector 100 and into an adapter and ultimately the user's drinking hose. A piston head 146 is defined at the top of piston 140 and provides a reaction surface against which an actuator in an adaptor connected to a user's drinking hose may engage to force piston 140 downward through piston cylinder 155 to engage the foil seal 530 over the dispensing outlet 520 of nutrition pouch 500.

Figure 14:
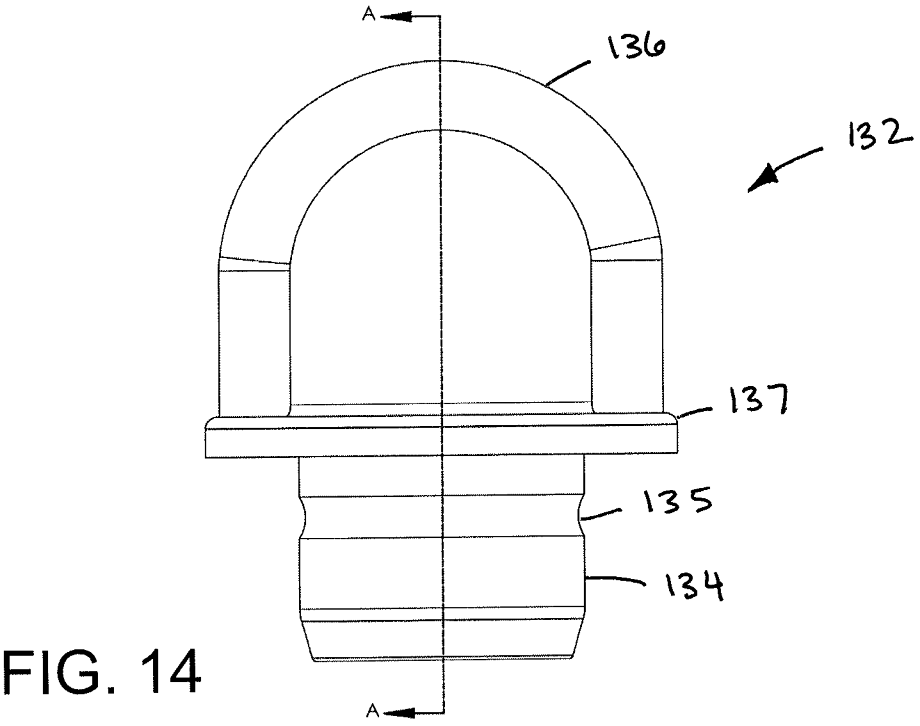
FIG. 14 is a side view of a cap plug of the nutrition pouch connector of FIG. 3.
Figure 15:
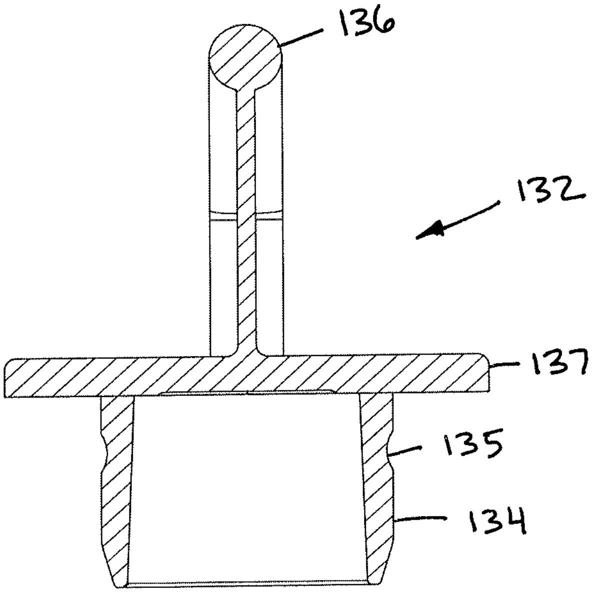
FIG. 15 is a cross-sectional view of the cap plug of FIG. 14.

As mentioned above and with particular reference to FIGS. 7, 14 and 15, prior to use a user may apply connector 100 to a nutrition pouch 500 with cap plug 132 engaging cap plug receiver 154. As noted above, open outlet end 151(*b*) of spool core 150 includes top compressible member seal seat 157 that receives a compressible sealing member 170 to seal against the exterior of cylindrical outlet engaging arm 134 of cap plug 132. Preferably, outlet engaging arm 134 includes a circumferential notch 135 that receives an interior circumferential edge of O-ring 170 so as to provide a tight seal between cylindrical outlet engaging arm 134 and connector outlet 130. A grip, such as a U-shaped grip 136, extends upward from a cap 137 of cap plug 132 to allow a user to easily grip and pull off the cap plug 132 for attachment to a user's hydration system, or alternatively to allow the combined nutrition pouch 50 and connector 10 to be attached to a hook or other carrier on the user's body or another carrying device.

Figure 16:
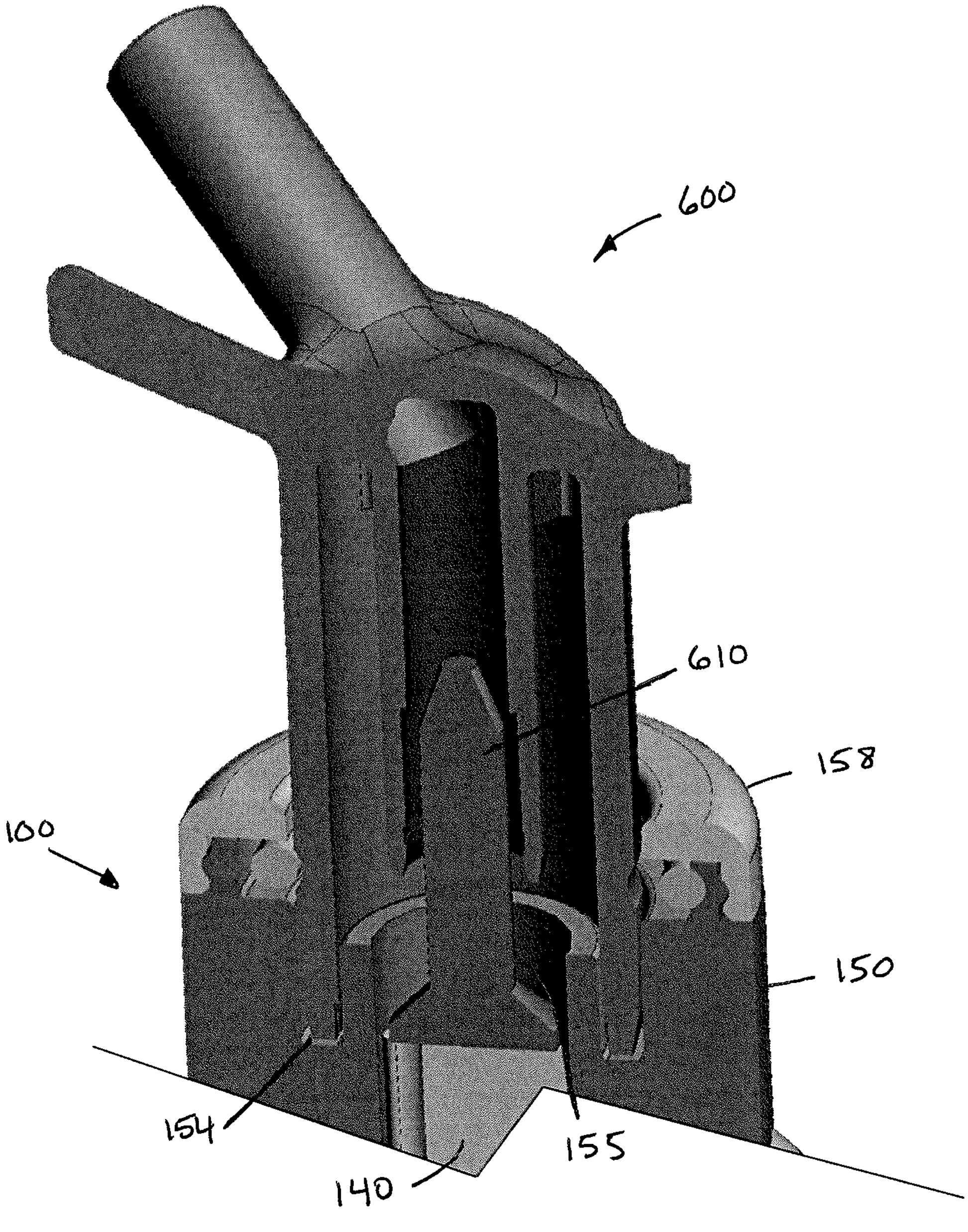
FIG. 16 is a cross-sectional partial view of a nutrition pouch connector according to further aspects of an embodiment of the invention in use with an adapter of a user's hydration system.

Next, and with reference to the schematic view of FIG. 16, connector 100 may be used in the following manner. As explained above, connector 100 may be attached to the dispensing outlet 520 of a nutrition pouch 500, and when ready for consumption, cap plug 132 may be manually removed from connector outlet 130. At that point, an adapter 600 from a user's hydration system (of known configuration to those of ordinary skill in the art) is manually inserted into the connector outlet 130 such that the bottom arms of the adapter extend into cap plug receiver 154. Adapter 600 includes an actuator 610 that is configured to engage piston head 146 of piston 140 as the adapter 600 is pushed into connector 100, in turn causing piston 140 to move downward through piston cylinder 155 so as to pierce the foil cover 530 extending over the dispensing outlet 520 of nutrition pouch 500. Once the foil cover 530 of dispensing outlet 520 has been pierced, product within nutrition pouch 500 may be drawn by the user through their connected hydration system from the nutrition pouch 500, through flow channels 144 around piston 1402, and out from outlet end 130 of connector 100 and into the adapter 600 and ultimately the user's hydration system.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A nutrition tube connector, comprising:
- a multi-piece body portion defining an internal channel extending from a bottom of said multi-piece body portion to a top of said multi-piece body portion;
- at least one body retainer holding multiple sections of said multi-piece body portion in a fixed configuration;
- a spool core having a bottom head, a central portion and an upper head, wherein said bottom head and said central portion are positioned inside of said internal channel of said multi-piece body portion and said upper head extends above a top end of said multi-piece body portion, said spool core having an open piston chamber extending there through;
- a piston movably mounted in said piston chamber and held in an upper position in said piston chamber at a detent; and
- a cap plug removably positioned in a cap plug receiver at a top end of said spool core.

2. The nutrition tube connector of claim 1, said internal channel of said multi-piece body portion having a first portion of a mating connection configured to receive a second portion of said mating connection on a disposable nutrition pouch.

3. The nutrition tube connector of claim 2, wherein said cap plug receiver is configured to receive an inlet of an adapter of a fluid hydration system comprising the adapter, a hose connected to the adapter, and a fluid delivery device connected to the hose and configured for connection inside of a safety mask.

4. The nutrition tube connector of claim 3, wherein said piston is positioned in said connector so as to engage said adapter and to move toward said first portion of said mating connection upon engagement of said adapter in said cap plug receiver.

5. The nutrition tube connector of claim 3, further comprising a compressible sealing member positioned between said cap plug and said spool core.

6. The nutrition tube connector of claim 5, further comprising an end cap positioned over a top end of said spool core, wherein at least a portion of said end cap extends over said compressible sealing member.

7. The nutrition tube connector of claim 2, said spool core further comprising a nutrition pouch outlet seat positioned to abut a top face of said disposable nutrition pouch.

8. The nutrition tube connector of claim 7, further comprising a compressible sealing member positioned at a bottom of said spool core adjacent to said nutrition pouch outlet seat and engaging a horizontal compressible sealing member support wall in said multi-piece body portion.

9. The nutrition tube connector of claim 1, wherein said piston chamber has a narrowing diameter from a bottom of said piston chamber to a top of said piston chamber.

10. The nutrition tube connector of claim 9, said piston having a head portion sized to contact an upper, interior face of said piston chamber.

11. The nutrition tube connector of claim 1, said piston further comprising a plurality of arms extending radially outward from a center support of said piston, said piston defining a fluid flow channel between each adjacent pair of arms.

12. The nutrition tube connector of claim 11, said piston chamber further comprising a circumferential notch adjacent a bottom of said piston chamber.

13. The nutrition tube connector of claim 12, wherein said detent comprises a ridge extending radially outward from each said arm and said circumferential notch.

14. The nutrition tube connector of claim 13, wherein each said arm further comprises a blade portion at a bottom surface of each said arm.

* * * * *